United States Patent [19]

Harris et al.

[11] Patent Number: 5,045,290

[45] Date of Patent: Sep. 3, 1991

[54] RECOVERY OF PURE PLATINUM AND PALLADIUM

[75] Inventors: Bryn G. Harris, Beaconsfield; Serge Monette, Longueuil; Jean-Pierre Barry, Montreal; Robert Stanley, Kirkland, all of Canada

[73] Assignee: Noranda Inc., Toronto, Canada

[21] Appl. No.: 536,796

[22] Filed: Jun. 12, 1990

[30] Foreign Application Priority Data

Jun. 22, 1989 [CA] Canada .................................. 603699

[51] Int. Cl.$^5$ .............................................. C22B 3/26
[52] U.S. Cl. ......................................... 423/22; 75/722
[58] Field of Search ............................ 423/22; 75/722

[56] References Cited

U.S. PATENT DOCUMENTS 4,654,145 3/1987 Demopoulos et al. ................ 75/722
4,942,023 7/1990 De Schepper et al. ............... 423/22

Primary Examiner—Melvyn J. Andrews
Attorney, Agent, or Firm—Fleit, Jacobson, Cohn, Price, Holman & Stern

[57] ABSTRACT

A process for recovery of platinum and palladium from an impure substantially gold-free precious and base metal-bearing acidic chloride or mixed chloride/sulphate solution comprises the steps of: contacting the acidic solution having a pH less than about 1.5 with an organic solution comprising an 8-hydroxy quinoline solvent extraction reagent, a phase modifier and an aromatic diluent to extract simultaneously platinum and palladium into the organic solution; scrubbing the loaded organic solution to remove co-extracted impurities and acid; stripping the loaded organic with a buffer solution operating in the pH range 2–5 at 20°–50° C. to selectively recover the platinum; stripping the platinum-free loaded organic with 3–8 M hydrochloric acid to recover the palladium; and regenerating the organic solution by washing with water.

10 Claims, 1 Drawing Sheet

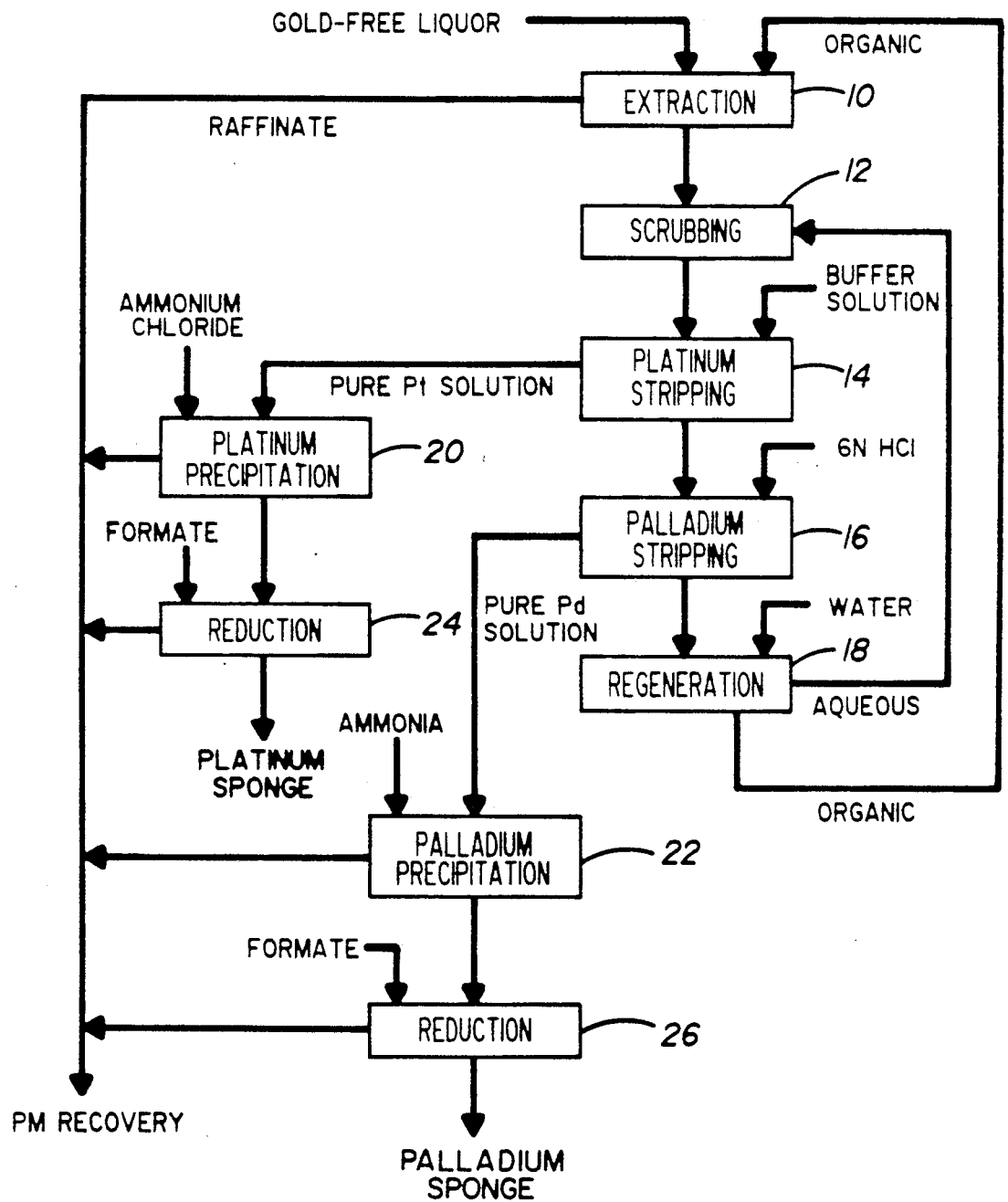

RECOVERY OF PURE PLATINUM AND PALLADIUM

BACKGROUND OF THE INVENTION

1. Field of the Invention

This invention relates to the recovery of pure platinum and palladium from an impure substantially gold-free precious and base metal bearing acidic chloride or mixed chloride/sulphate solution, such as might be found in the parting plant of a base metals refinery, and more particularly, a copper electrorefinery.

2. Prior Art

Until relatively recently, the platinum group metals (PGM) were recovered by classical precipitation procedures, which involved many repeated precipitation/redissolution stages in order to obtain metal of the desired purity. These processes are extremely tedious and time-consuming, with metal being tied-up in process often for many months. In the middle and late seventies, the major precious metal refiners introduced new solvent extraction processes in order to produce refined metal of higher purity, more quickly, and at lower cost. These processes have recently been reviewed in an article entitled Recovery and separation of platinum and palladium by co-extraction and differential stripping, in *Separation Processes in Hydrometallurgy*, (G. A. Davies, Editor), SCI, London 1987, p. 174. The processes used for palladium are based on either oxime (such as used by Johnson Matthey) or on alkyl sulphide (as used by INCO) extractants, both of which suffer from a number of drawbacks. The oxime extractants exhibit slow kinetics, are not highly selective, and require modifiers to make them effective. The alkyl sulphide extractants, whilst being very selective, have very slow kinetics, which mitigate against continuous operation. The loaded organics also have to be stripped with ammonia solutions, which dictates that it is essential to remove all traces of gold down to <1 mg/L in the feed, since ammonia and either soluble or metallic gold can form potentially explosive solutions.

No completely satisfactory extractants have been reported for platinum. INCO uses TBP, which is acceptable only if there is a high level of platinum in the feed solution and if the base metal content is low.

Recently, Demopoulos and co-workers have patented the results of studies on the use of substituted 8-hydroxy quinoline derivatives for the recovery of both platinum and palladium (U.S. Pat. No. 4,654,145 which was issued Mar. 31, 1987). These reagents have the advantages that extraction and stripping kinetics are considerably faster than with oximes and alkyl sulphides, thereby permitting continuous operation, and that ammonia is not required for stripping.

The information published in the above patent indicates the potential of the substituted 8-hydroxy quinoline reagents. The reagents were tested for aqueous systems whereby gold, palladium and platinum were co-extracted, and then each metal selectively recovered from the loaded organic. Gold was recovered by third phase formation (i.e. by directly precipitating the metal from the organic with hot water). However, this is not a desirable operation for commercial practice, and since platinum stripping is also effected by water, there is a strong possibility of producing gold contaminated with platinum, and of losing platinum to the gold circuit. Hence, it is preferable to use feed solutions in which the gold has been preferentially removed, for example by sulphur dioxide precipitation.

Platinum and palladium can be co-extracted into the organic phase, although the published data show that high acidity is required for effective platinum extraction and low acidity for palladium extraction. Demopoulos recommends 2-3M hydrochloric acid. Whilst the reagent is claimed to be reasonably selective, it is clear from the published data that significant quantities of copper (in particular), silver, and other base metals typically found in process streams originating from copper electrorefinery feedstocks can be co-extracted. If not removed, these impurities eventually report to the refined metals. In our own testwork, it has also been noted that these reagents co-extract large quantities of acid, which has an appreciable effect on the platinum stripping circuit.

Selective stripping, or direct hydrogen reduction of the loaded organic has been described in the above patent for the recovery of platinum and palladium from the loaded organic. Hydrogen reduction is not an attractive proposition on a commercial scale because of the many operational problems it creates. The proposed method for stripping platinum is to use several stages of water. This is only a feasible proposition at low platinum loadings, since the strip liquor very quickly becomes acidic, and back extraction occurs, generally at pH<1.5. Therefore, it is extremely difficult to generate a strip solution with any degree of platinum concentration.

Palladium stripping can be effected in several stages by 2-8M hydrochloric acid. In practice, it has been found that six stages are required with an acidity of 8M acid, otherwise the loaded organic is not fully stripped.

SUMMARY OF THE INVENTION

It is the object of the present invention to provide a process for recovery of platinum and palladium from precious and base metal bearing acidic chloride or mixed chloride/sulphate solutions wherein the major inadequacies of the process disclosed by Demopoulos and co-workers have been eliminated.

The process in accordance with the invention comprises the steps of:

a) contacting the acidic solution having a pH less than about 1.5 with an organic solution comprising an 8-hydroxy quinoline solvent extraction reagent, a phase modifier and an aromatic diluent to extract simultaneously platinum and palladium into the organic solution;

b) scrubbing the loaded organic solution to remove co-extracted impurities and acid;

c) stripping the loaded organic with a buffer solution operating in the pH range 2-5 at 20-50° C. to selectively recover the platinum;

d) stripping the platinum-free loaded organic with 3-8M hydrochloric acid to recover the palladium; and e) regenerating the organic solution by washing with water.

The organic solution preferably comprises 5-20% by volume of the solvent extraction reagent and 10-30% by volume of the modifier dissolved in the aromatic diluent. The phase modifier is preferably a long chain alcohol such as isodecanol or tridecanol.

Optimum extraction of both platinum and palladium is effected at a pH of about 0 and a temperature of 20-50° C. especially with solutions containing substantial amounts of copper and rhodium.

Scrubbing of the loaded organic is preferably carried out in two stages, the first stage being carried out with a scrubbing solution at a pH of about 0 to remove co-extracted impurities, and the second stage being carried out at a pH 1-1.5 to remove co-extracted acid.

The buffer solution used for stripping platinum from the loaded organic is preferably an aqueous sodium acetate or sodium phosphate solution. Platinum is preferably stripped from the organic solution at a temperature between 40° and 45° C.

Palladium stripping is preferably carried out in six stages at an acid strength of 8M.

Regeneration of the organic by washing with water removes a significant proportion of the acid extracted during palladium stripping. Such wash water is preferably recycled to the first scrubbing stage.

BRIEF DESCRIPTION OF THE DRAWING

The invention will now be disclosed, by way of example, with reference to the accompanying drawing which is a schematic diagram of the process in accordance with the invention.

DETAILED DESCRIPTION OF THE DRAWING

Referring to the drawing, a gold-free liquor is contacted in an extraction stage 10 with an organic solution comprising an 8-hydroxy quinoline solvent extraction reagent, a phase modifier and an aromatic diluent to extract simultaneously platinum and palladium into the organic solution. The organic solution contains 5-20% (preferably 15%) by volume of the solvent extraction reagent and 10-30% (preferably 25%) by volume of the phase modifier dissolved in the aromatic diluent. The phase modifier is a long chain alcohol, preferably isodecanol or tridecanol and the aromatic diluent preferably SOLVESSO 150 (trademark). Applicant has found that optimum extraction of both palladium and platinum is effected at a pH of about 0 with highly contaminated solutions, at a temperature of 20-50° C., preferably ambient temperature. The pH of extraction is, in fact, extremely important, particularly with respect to copper and rhodium. In order to maximize the efficiency of palladium extraction, it is preferable to extract at as high a pH as possible. Platinum extraction, at pH <1.5 was found to be largely insensitive to pH. Copper co-extraction, however is very sensitive to pH. At pH>0, significant quantities of copper are co-extracted, with the result that effective organic loading for palladium and platinum is reduced. Also at pH>0, the co-extraction of rhodium increases appreciably, being quantitative at pH=3, which can lead to significant losses of this very valuable metal. At pH<0, palladium extraction from concentrated feed solutions (>10 g/L) begins to drop off markedly, and copper co-extraction also increases, although not to the same extent as at pH>0. Thus, it has been found that pH=0 is the most effective pH for palladium and platinum extraction with 8-hydroxy quinoline extractants.

Even at pH=0 significant quantities of copper may be co-extracted, depending on its concentration in the feed. A certain amount of silver and acid is also co-extracted, and it is beneficial to remove all these from the loaded organic prior to recovery of palladium and platinum. It has been found that this can be achieved very effectively by a two-stage HCl scrub 12. In the first stage, scrub liquor is fed at pH=0, in which copper, silver and any other base metals are effectively removed. In the second stage, pH control at 1-1.5, preferably 1.5, then removes most of the co-extracted acid.

Platinum stripping (stage 14) is effected by a specially prepared buffer solution. It has been found that both sodium acetate and sodium phosphate buffer solutions are very effective at stripping platinum from the loaded organic reagent. It is understood that any buffer solution which operates in the pH range 2-5 will be suitable. The use of a buffer solution permits the complete stripping of platinum in one stage, although two are generally used, and also of building up a strong platinum solution which was impossible with the water strip described in Demopoulos U.S. Pat. No. 4,654,145. This is because during stripping with water, the acid co-extracted during extraction causes the pH of the stripping solution to drop below 2.0, and platinum begins to re-extract onto the organic. The use of a buffer solution prevents this drop in pH and allows platinum stripping to proceed. It has also been found that whilst operation at ambient temperature is adequate, phase separation and organic entrainment is appreciably reduced at 45° C. Thus, use of the second scrub stage to remove most of the co-extracted acid, and use of a buffer solution in the range pH 2-5 (preferably pH=3.8) alleviates this problem, and also permits the platinum concentration to be built up considerably.

Palladium stripping (stage 16) can only be effected by strong hydrochloric acid. It has been found that if the organic is fully loaded then six stages are required, at an acid strength of 8M. Lower acidites result in incomplete palladium stripping.

The organic is finally regenerated (stage 18) by washing with water, in order to remove a significant proportion of the acid extracted during palladium stripping. The wash water is preferably recycled to the first scrubbing stag because if this acid is allowed to return to the extraction stage, then it has a deleterious effect on palladium extraction. The organic solution is recycled to the extraction stage 10.

Platinum and palladium metals are recovered from the strip solutions by conventional precipitation techniques, the technique to be chosen depending largely on the purity of the original feed solution. Where the feed was highly impure, then classical precipitation procedures with ammonium chloride for platinum precipitation (stage 20), and ammonia for palladium precipitation (stage 22) followed by reduction to metal (stages 24 and 26) using formates are preferable. For relatively clean feeds, then direct reduction of the strip liquor to metal is possible.

The invention will now be disclosed, by way of example, with reference to the following examples:

EXAMPLE 1

Effect of pH on extraction

A solution containing 9.6 g Pd/L, 0.4 g Pt/L and 3.5 g Cu/L, and having previously been neutralized to pH 0 was subjected to three stages of extraction with an organic solution containing 15% 8-hydroxy quinoline derivative, 25% isodecanol and 60% SOLVESSO 150, at ambient temperature and an extraction time of 4.5 minutes/stage. The same feed solution, but neutralized to pH 0.5, was also treated with the same organic under the same extraction conditions. The results are shown below.

| Feed Solution, g/L | | | | Raffinate, g/L | | |
|---|---|---|---|---|---|---|
| Pd | Pt | Cu | pH | Pd | Pt | Cu |
| 9.6 | 0.4 | 3.5 | 0.0 | 0.5 | <1 mg | 2.1 |
| | | | 0.5 | 0.4 | <1 mg | 1.6 |

The results demonstrate the effect of feed pH on copper co-extraction, and also indicate that palladium is better extracted.

EXAMPLE 2

Impurity removal during scrubbing

The loaded organic (extraction at pH=0) from Example 1 was scrubbed with pH=0 HCl for fifteen minutes at ambient temperature. After scrubbing, the aqueous phase was found to analyse 1.5 g Cu/L, representing >99% removal from the organic, but only 80 mg Pd/L and 15 mg/L Pt. This demonstrates the effectiveness of the scrub stage for the removal of co-extracted impurities, such as copper.

EXAMPLE 3

Platinum stripping with water

A loaded, washed organic solution (16.4 g Pd/L, 0.92 g Pt/L) was contacted several times with water at an O/A (organic to aqueous) ratio of 2:1, at 45° C., for 5 minutes per contact. The results were as shown below.

| Contact No. | Pt, mg/L | % Platinum Stripped | |
|---|---|---|---|
| | | Stage | Cumulative |
| 1 | 469 | 24.8 | 24.8 |
| 2 | 565 | 31.4 | 56.2 |
| 3 | 59.5 | 3.1 | 59.3 |
| 4 | 16.5 | 0.9 | 60.2 |

These results show the inability of a simple water strip, as proposed in U.S. Pat. No. 4,654,145 to effectively recover the platinum from the loaded organic.

EXAMPLE 4

Platinum stripping with buffer solution

The loaded, scrubbed organic from Example 2 was stripped with a solution of 2M sodium phosphate (pH 3.8), at 45° C. in a two-stage countercurrent circuit, at an organic to aqueous ratio of 4.7:1. The first stage strip solution had a platinum concentration of 2.7 g/L and the second 4.55 g/L, representing 100% platinum recovery from the loaded organic.

A second scrubbed, loaded organic solution (2.04 g Pt/L) was contacted at 45° C. in two separate contacts at an organic to aqueous ratio of 2:1 with a sodium acetate buffer solution at pH 3.8. In the first contact 96% of the platinum was stripped, and this was increased to 100% after the second contact, with aqueous strip concentrations at 3.92 g Pt/L and 0.16 g Pt/L respectively.

EXAMPLE 5

Palladium stripping

The organic from Example 4 was contacted in a six-stage countercurrent circuit with 8M HCl, at ambient temperature and an organic to aqueous ratio of 1.2:1. The results were as follows:

| Stage No. | Pd, g/L |
|---|---|
| 1 | 2.38 |
| 2 | 4.07 |
| 3 | 5.96 |
| 4 | 7.97 |
| 5 | 10.2 |
| 6 | 11.7 |

The results show a gradual increase in palladium concentration, with 100% palladium recovery from the organic. The strip solution had a palladium purity close to 99%, and had a concentration factor of 21% over the feed.

EXAMPLE 6

Pilot operation

A solvent extraction circuit was established to test the flowsheet on a countercurrent continuous basis at an aqueous feed flowrate of 15-25 mL/minute. The circuit comprised three extraction, two scrub, two platinum strip, six palladium strip and one regeneration wash stages. The following Table gives average running conditions over a three-day period, clearly demonstrating the effectiveness of the circuit for separating, purifying and concentrating both palladium and platinum. Ammonia precipitation from these solutions gave metals assaying >99.95% in both cases.

| | Metal Concentration, mg/L | | | | | | | | | | |
|---|---|---|---|---|---|---|---|---|---|---|---|
| | Pd | Pt | Cu | Au | Rh | Ag | Pb | Fe | Bi | Sb | Te | Se |
| Feed liquor | 6814 | 713 | 2120 | <0.33 | 40.8 | 69.4 | 274 | 154 | 1.77 | <0.69 | 63.1 | 88.5 |
| Raffinate | 87.3 | 1.20 | 1572 | — | 43.4 | — | — | — | — | — | — | — |
| Scrub Liquor | 80.0 | 15.0 | 1771 | — | 1.6 | — | — | — | — | — | — | — |
| Platinum strip liquor | <0.25 | 4150 | 0.1 | <0.32 | 5.2 | 10.2 | 21 | 1.36 | 2.58 | <0.69 | 9.48 | 8.64 |
| Palladium strip liquor | 12700 | 25.8 | 23.9 | <0.32 | 27 | 37.3 | 1.01 | <0.14 | 10.9 | <0.69 | <1.0 | 1.48 |

We claim:

1. A process for recovery of platinum and palladium from an impure substantially gold-free precious and base metal-bearing acidic chloride or mixed chloride/sulphate solution, comprising the steps of:
   (a) contacting the acidic solution having a pH less than about 1.5 with an organic solution comprising an 8-hydroxy quinoline solvent extraction reagent, a phase modifier and an aromatic diluent to extract simultaneously platinum and palladium into the organic solution, thereby resulting in an organic solution loaded with platinum and palladium as well as co-extracted base metal impurities and acid;
   (b) scrubbing the loaded organic solution of step (a) to remove the co-extracted base metal impurities and acid;
   (c) stripping the scrubbed loaded organic solution of step (b) with a buffer solution operating in the pH range 2-5 at 20-50° C. to selectively recover the platinum, thereby resulting in a platinum-free loaded organic solution;

(d) stripping the platinum-free loaded organic solution of step (c) with 3-8 hydrochloric acid to recover the palladium, thereby resulting in a palladium-free organic solution; and (e) regenerating the palladium-free organic solution of step (d) by washing with water.

2. A process as defined in claim 1, wherein the organic solution of step (a) comprises 5-20% by volume of the solvent extraction reagent and 10-30% by volume of the phase modifier dissolved in the aromatic diluent.

3. A process as defined in claim 2, wherein the phase modifier is a long chain alcohol.

4. A process as defined in claim 1, 2 or 3 wherein the impure acidic solution contains copper in which case the pH of said solution is maintained at about 0.

5. A process as defined in claim 1, 2 or 3 wherein the extraction is carried out at a temperature of 20-50° C.

6. A process as defined in claim 1, wherein scrubbing is carried out in two stages, the first stage being carried out with a scrubbing solution at a pH of about 0 to remove the co-extracted base metal impurities, and the second stage being carried out at a pH 1-1.5 to remove co-extracted acid.

7. A process as defined in claim 1, wherein the buffer solution is an aqueous sodium acetate or sodium phosphate solution.

8. A process as defined in claim 1 or 7, wherein platinum is stripped from the organic at 40-45° C.

9. A process as defined in claim 1, wherein palladium stripping is carried out in six stages at an acid strength of 8M.

10. A process as defined in claim 6, wherein regeneration of the palladium-free organic solution of step (d) comprises washing with water to remove the acid extracted during palladium stripping and recycling said wash water to the first scrubbing stage.

* * * * *